Dec. 1, 1964  H. C. TSIEN  3,159,024
APPARATUS FOR ANALYZING IRREGULAR MOTIONS OF MACHINERY
Filed Aug. 30, 1962  2 Sheets-Sheet 1

HSUE C. TSIEN  INVENTOR

BY

ATTORNEY

HSUE C. TSIEN  INVENTOR

ATTORNEY though only one such cell may be used in some instances as shown in FIG. 6. An opaque shutter or baffle 57 is mounted across the casing in such a way as to intercept light passing from the source 50 to the cell 56. Thus only the cell 55 is illuminated by light from source 50 when the shutter 45 and bar 31 are in the extreme right-hand position. However, the shutter 45 is provided with an opening or window 59 which, when the bar 31 is moved to the left, registers with the opening past the edge of baffle 57 so that cell 56 is also exposed to light from the source 50.

United States Patent Office 3,159,024
Patented Dec. 1, 1964

3,159,024
APPARATUS FOR ANALYZING IRREGULAR
MOTIONS OF MACHINERY
Hsue C. Tsien, Livingston, N.J., assignor to Esso Research and Engineering Company, a corporation of Delaware
Filed Aug. 30, 1962, Ser. No. 220,509
3 Claims. (Cl. 73—71.3)

The present invention relates to improvements in apparatus for analyzing irregular motions of machinery. It has particular application to a device which may be called a motor or engine roughness analyzer. While primarily adapted for use in testing the operation of automobile engines, the device has other applications and, in fact, can be applied to analysis of the operations of many types of machines. The following description will relate primarily to its use in connection with an automobile engine, but it is to be understood that the invention has other and broader applications.

In the prior art numerous devices of the "stethoscope" type have been suggested for trouble-shooting in automobile garages and service shops in attempts to provide quick and reliable analyses of malperformance of automobile engines and related equipment. Some of these devices have attempted to study particular forms of vibration or micro-movements, including high frequency noises, resonance, etc. The present device is distinguished from these in that it is applicable primarily to the analysis and interpretation of larger motions, i.e., motions of physical displacement of a machine or element as contrasted to resonant vibration within a part.

In automobiles, gor example, there are commonly provided flexible engine mounts, usually of firm rubber, which permit the engine as a whole to move to a certain degree about its axis or transversely with respect to the automobile frame. The movement is one of actual physical displacement to a resonable extent. This type of mounting avoids the transmission of numerous vibrations and sounds from the engine to the frame, and vice versa. It also gives some protection to the mechanism. Since the mounts are not rigid, an engine operating irregularly will exhibit certain characteristics of rocking about its axis or shifting bodily sidewise to an extent dependent on the forces involved. The present invention takes advantage of this type of physical displacement movement and affords a simple means for analyzing such motions. By such analysis, the type or kind of malfunction usually can be quickly identified.

While not a part of the present invention, it has recently been discovered that various types of malfunctions, particularly those most commonly encountered in automobile engines, give characteristic recordings which make it possible to make prompt and accurate analyses. For example, in co-pending application Serial No. 139,979, filed on September 22, 1961, a system analogous to the present, in principle, is described which includes a showing of the graphical representations obtainable on engine analysis. Similar analyses may be made by the present invention.

The present invention is an improvement over that described in the application mentioned above in that it provides a relatively simple and inexpensive analyzer. The device, nevertheless, is quite accurate and it can follow rapid engine movements and displacements with considerable precision and in considerable detail.

It is a primary object of the present invention to make available a simple and relatively inexpensive apparatus which will sense, pick up and record graphically, the major irregular motions of machine parts due to malfunction with such accuracy that the malfunctioning may be quickly and competently analyzed. Other objects will appear as this description proceeds and therefore reference will next be made to the drawings wherein.

Figure 1:
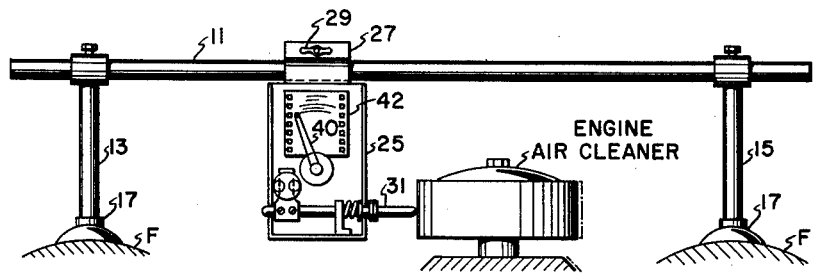
FIG. 1 is a view in elevation, certain parts being shown only diagrammatically, of an analyzer made according to the present invention as applied to an automobile.

Referring first to FIG. 1, the apparatus is shown as comprising a supporting bar or tube 11 which is mounted on adjustable posts 13 and 15. These are adapted to be supported on suitable parts of the machinery being tested, for example, on the fenders F of an automobile, flexible and non-abrasive foot cushions or cups of rubber or the like being provided as shown at 17.

The recording apparatus per se comprises a box or casing 25 made a suitable material, such as a metal or plastic, provided with an attaching clamp 27, which may be in split or C form, to fit around the supporting tube or pipe 11.

Figure 4:
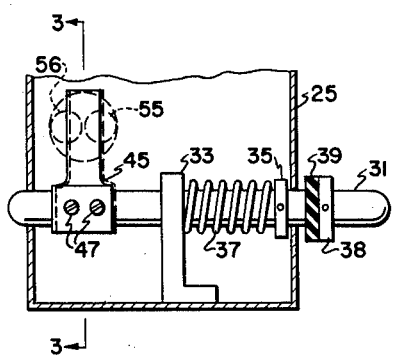

Referring next to FIG. 4, a reciprocably mounted sensing element in the form of a bar or push-rod 31 is provided in the casing 25, being mounted so as to slide freely to and fro through openings in the side walls of the casing. The element 31 also is supported in a bracket 33 mounted in any suitable fashion within the casing. The rod 31 bears a collar 35 riveted or otherwise suitably secured thereto. This is normally urged towards the wall 25 of the casing, but can move to the left as it is shown in FIG. 4. A generally similar collar 38 is also attached by suitable means to the bar 31 outside the casing. Collar 38 is shown provided with a resilient pad 39 of rubber or other non-abrasive material so that the outside of casing 25 may be protected from marring when the rod 31 is pushed to the right far enough for the collar to bump the casing.

In setting up the device for an engine test, the C-clamp wing nut 29 is loosened and the casing 25 is moved along supporting bar or tube 11 until the spring 37 is partially compressed and the recording device per se is brought essentially to its middle or zero position. In such position a recording stylus 62, to be further mentioned below, is also approximately in its middle or zero position. The sensor element and related parts are shown in approximately zero position in FIG. 4. Obviously the sensing device, bar 31, can move from this position either to the right or to the left as the engine vibrates or moves about its axis.

The rear end of the bar 31 is split to receive an upstanding plate or shutter element 45. The latter is fastened to the bar 31 by any suitable means such as screws 47. Its purpose is to cause variations in the light transmitted between a light source and a light sensing device next to be described.

Figures 2, 3:
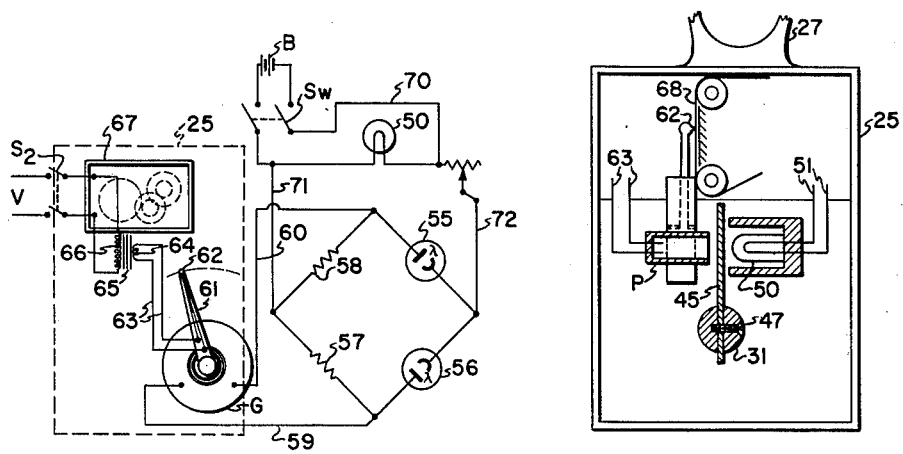
FIG. 2 is a diagrammatic view showing internal wiring arangement and showing diagrammatically certain operating parts of the system of FIG. 1.
FIG. 3 is a vertical sectional view of the recording part of the apparatus, this being taken substantially along the line 3—3 of FIG. 4 which is a transverse fragmentary sectional view of the same apparatus.

Referring now to FIG. 3, a light source 50, such as an incandescent lamp supplied with electrical current through leads 51, is placed in a suitable receptacle 53 on one side of the shutter plate 45 (which reciprocates back and forth in response to the engine vibrations) which moves the bar 31 against or with the spring 37. A photosensitive element is shown at P, FIG. 3. Preferably the element P comprises two small photoconductive cells 55 and 56, FIG. 4. These are mounted in such a manner that each of them receives a more or less equal part of the light coming from source 50 when the shutter is in its zero position, approximately as shown in FIG. 4. If the engine moves to the right, spring 37 will push the bar 31 also to the right, and the shutter will allow more light to fall on cell 56 and less on cell 55. Conversely, if shutter 45 is pushed to the left, more light will fall on cell 55.

Figure 5:
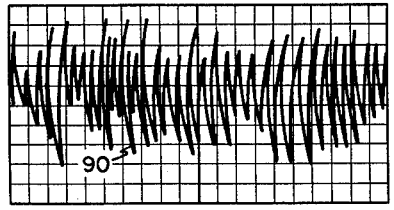
FIG. 5 is a typical chart of the type produced by the recording mechanism which forms part of this invention.

The photocells are built into a Wheatstone bridge or equivalent balanced circuit, as shown in FIG. 2. In the normal or zero position, this circuit, which comprises the photoconductive cells 55, 56 and two resistances 57 and 58 of suitable magnitude, is connected to a recording galvanometer G by leads 59 and 60. The pointer of galvanometer G, shown at 61, bears a recording device or stylus 62 which may be operated to make a record on a moving chart. The recording device 62 may be heated electrically through power supplied by leads 63 connected to the secondary 64 of a transformer 65. In this case the recording chart paper is thermosensitive. The primary, 66, of transformer 65 is connected, through switch $S_2$, to a power source such as electric mains of suitable voltage. The primary 66 may be in parallel with a motor drive indicated generally at 67 which is provided to feed a recording chart 68 on which the engine vibrations are to be recorded. A typical section of chart is shown in FIG. 5.

The balanced Wheatstone bridge circuit itself is kept at proper potential by a voltage source, shown here as a battery B, through a double-pole switch SW, and leads 70 and 71. Ordinarily the instrument will be connected to the automobile battery. Hence battery B may be the conventional 12-volt battery or 6-volt battery in an automobile being tested. If desired, however, the balanced circuit can be connected to a separate power source. By means of a shunt circuit, the light source 50 also may be powered from the same battery. The chart drive likewise may be battery operated if desired, as noted above. A potentiometer or rheostat 72 is provided to apply the proper bias adjustment to the Wheatstone bridge.

It will be understood that as the spring biased sensing element 31 moves to and fro following the movements of the machine part, e.g., the engine air cleaner, the shutter 45 will expose more or less light from one or the other of the photoconductive cells 55 or 56 with a corresponding change in the other. The balanced circuit of the Wheatstone bridge or equivalent then becomes unbalanced. This imposes an electrical bias on the galvanometer which causes its needle or pointer 61 to deflect to the right or to the left of its normal zero position. In FIG. 2 the deflection is shown to the left. The electric recorder 62 which may operate by heat to trace a record on the strip chart 42, or may employ ink or other recording media, then records with generally proportional amplitude the various irregular movements of the machine part under test. For example, if an automobile engine has an amplitude of displacement motion of ⅟₁₆-inch in either direction from its normal or zero position, this may be amplified by twenty, thirty, forty or fifty times, or more, to produce a recording chart of the general type shown in FIG. 5. This particular chart bears a general resemblance to the type commonly obtained from an automobile engine where there is maladjustment of the carburetor. The tracing 90 varies considerably in amplitude and may vary widely in frequency, at least between major impulses or variations. An experienced operator, knowing the various types of tracings obtained by different kinds of malfunctions such as spark plug misfire, carburetor maladjustment, defective compression caused by bad valves, piston rings, and the like, can quickly distinguish between the different types of trouble. This makes it possible for him to analyze quickly and with a high degree of assurance the various types of malfunction which may be brought to his attention.

It will be understood that various other modifications can be made in the equipment without departing from the spirit of this invention. While the particular arrangement of the Wheatstone bridge with its balanced circuit and the light sensitive elements which provide imbalance on deflection is presently preferred, various modifications can be employed. Two of these are shown in FIGS. 6 and 7.

Figure 6:
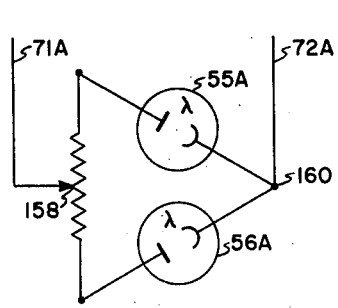
FIG. 6 shows a modification wiring diagram which can be substituted in FIG. 2.

FIG. 6 shows a balanced circuit which is generally equivalent to the Wheatstone bridge circuit of FIG. 2, but somewhat simpler. Here the leads 71A and 72A, corresponding respectively to leads 71 and 72 of FIG. 2, are connected respectively to a potentiometer 158 and a connecting point 160. The latter is the juncture for the photoconductive cells 55A and 56A which are similar in design and operation to the cells 55 and 56 of FIG. 2. Obviously by adjusting the potentiometer 158, the circuit may be brought into balance in the same manner as the circuit of FIG. 2 is balanced.

Figure 7:
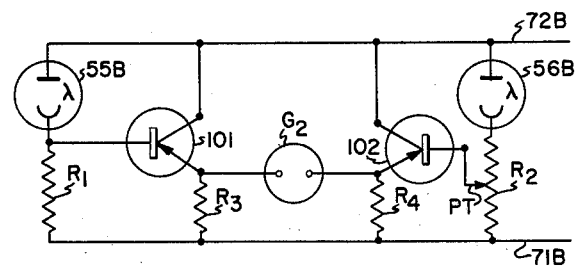
FIG. 7 shows another modification analogous to FIGS. 2, 6.

Referring now to FIG. 7, an arrangement is shown which provides for greater amplification of the sensed motion of the engine or other device being tested. Photoconductive cells 55B and 56B are included in the circuit, being generally equivalent to cells 55 and 56 of FIG. 2. These cells are connected in parallel between leads 71B and 72B which correspond in general respects to the leads 71 and 72 of FIG. 2. Each photoconductive cell is in series with a resistance indicated at $R_1$ and $R_2$ respectively. The latter form part of the potentiometer PT.

Also mounted in parallel between the leads 71B and 72B is a pair of PNP transistors 101 and 102. The base of each transistor is connected to the line containing the photosensitive cell adjoining, cell 102 being connected to potentiometer PT which can be adjusted relative to resistance $R_2$ to vary the bias and bring the system into balance. The emitter of each transistor is in series with a resistance, these being indicated at $R_3$ and $R_4$ respectively. The emitter terminal for each transistor also is connected to a terminal of galvanometer $G_2$. The collectors of both transistors are connected together to the common bus 72B. Obviously as the light falling on the photosensitive elements 55B and 56B varies, due to movement of the shutter, the circuit becomes unbalanced and the imbalance of voltage is amplified so as to produce a greater deflection of the galvanometer pointer than would normally be obtained. The transistors thus serve to amplify the voltage variations and consequently to amplify the magnitude of the galvanometer deflections. The result is that a magnified chart of the vibrations of the engine or other device under test can be produced.

For example, a single cell may be used or a divided cell and different types of light source may be employed. While it is preferred for simplicity to mount the shutter directly on the reciprocating sensing element 31, it may be operated indirectly by mechanical or electrical linkage if desired.

The system described above is simple in construction, inexpensive, and relatively trouble-free. Due to the simple construction of the reciprocating parts, it is easy to maintain good contact with the engine part and thus to obtain an accurate record without complicated feeler and sensing mechanism. The device is rugged and can be easily and quickly placed on and adjusted to the machine part to be tested.

If preferred, a light deflecting device such as a mirror or a reflector may be substituted for the shutter 45 or may be combined with the shutter. Thus a mirror or deflector, or lens, or the light source itself may be mounted directly on the sensor bar, with or without a supplemental light reflector, deflector, lens, or barrier so long as the electrical imbalance of the circuit, due to displacement of the apparatus under test, is generally representative of or at least roughly proportional to the extent of displacement. In other words, it is desirable that the chart produced shall represent or reproduce more or less linearly but in magnified form the actual movements to be recorded. This does not exclude recordings proportional to a root or power, etc., such as the square root or the square, of the magnitude of movement. Such representations are deemed properly within the scope and purview of the present invention.

It is intended by the scope of the following claims to cover those modifications coming within the spirit of the invention which would suggest themselves to those skilled in the art, as far as the prior art permits.

What is claimed is:

1. Apparatus for analyzing the operation of an internal combustion engine of the piston-driven crankshaft type wherein said engine is subjected to periodic normal and abnormal vibratory impulses generally about the crankshaft axis and wherein means are provided for mounting said engine to permit limited oscillatory freedom thereof about said axis to reflect said periodic impulses; in combination, sensing means including a spring-loaded plunger having one end thereof in contact with a portion of said engine radially displaced from said axis, means for mounting said sensing means to a relatively fixed structure adjacent to said engine with said plunger positioned generally tangentially with respect to said axis of rotation, the other end of said plunger being connected to a shutter means, a light source and a device capable of sensing variations in light from said source, said shutter means being positioned to at least partially interrupt light passing from said source to said device upon movement of said plunger, and normally balanced circuit means connected to said device and subject to imbalance by said light interruption, a recording galvanometer and circuit means connecting said galvanometer to said normally balanced circuit means, imbalance of said circuit means effecting correlative movement of said galvanometer, a stylus connected to said galvanometer, and graphical recording means including a drive motor for traversing said recording means adjacent to and in contact with said stylus for recording the frequency and amplitude of the oscillatory motion of said stylus in response to oscillations of said engine.

2. The combination according to claim 1 wherein a photosensitive element for controlling said normally balanced circuit is provided, said photosensitive unit comprising two photoconductive cells wherein the shutter causes light variations to increase in one cell while decreasing in the other.

3. The combination according to claim 2 wherein a voltage amplifying device is provided in the circuit to said galvanometer for increasing the sensitivity of the circuit.

References Cited in the file of this patent

UNITED STATES PATENTS

| | | |
|---|---|---|
| 2,410,094 | Martinec | Oct. 29, 1946 |
| 2,675,222 | Clark | Apr. 13, 1954 |
| 2,764,020 | Gadd | Sept. 25, 1956 |
| 2,991,649 | Kinsey | July 11, 1961 |